US006467023B1

United States Patent
DeKoning et al.

(10) Patent No.: US 6,467,023 B1
(45) Date of Patent: Oct. 15, 2002

(54) METHOD FOR LOGICAL UNIT CREATION WITH IMMEDIATE AVAILABILITY IN A RAID STORAGE ENVIRONMENT

(75) Inventors: Rodney A. DeKoning, August, KS (US); Donald R. Humlicek, Wichita, KS (US); Robin Huber, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/274,582

(22) Filed: Mar. 23, 1999

(51) Int. Cl.[7] .............................................. G06F 12/02
(52) U.S. Cl. .......................................... 711/114; 714/6
(58) Field of Search ................................ 711/114, 168, 711/170; 714/6

(56) References Cited

U.S. PATENT DOCUMENTS

| | | | | |
|---|---|---|---|---|
| 5,390,327 A | * | 2/1995 | Lubbers et al. ................. 714/7 |
| 5,394,532 A | * | 2/1995 | Belsan ......................... 395/425 |
| 5,430,855 A | * | 7/1995 | Walsh et al. ................. 395/275 |
| 5,450,384 A | * | 9/1995 | Dahman et al. ............... 369/30 |
| 5,522,031 A | * | 5/1996 | Ellis et al. ..................... 714/6 |
| 5,546,558 A | * | 8/1996 | Jacobson et al. ........... 395/441 |
| 5,574,851 A | * | 11/1996 | Rathunde .................... 711/114 |
| 5,621,882 A | * | 4/1997 | Kakuta .................. 395/482.04 |
| 5,657,468 A | * | 8/1997 | Stallmo et al. ............. 395/441 |
| 5,706,472 A | * | 1/1998 | Ruff et al. ............. 395/497.04 |
| 5,708,769 A | * | 1/1998 | Stallmo ................. 395/182.04 |
| 5,812,753 A | * | 9/1998 | Chiariotti ....................... 714/6 |
| 6,070,170 A | * | 5/2000 | Friske et al. ................ 707/200 |

OTHER PUBLICATIONS

American Megatrends RAID Overview; AST Computer; http://www.ejs.is/voruuppl/ast/ami-raid.htm: pp. 1-25.*

* cited by examiner

Primary Examiner—Hiep T. Nguyen
(74) Attorney, Agent, or Firm—Lathrop & Gage (57) ABSTRACT

Methods and associated structure for enabling immediate availability of a disk array storage device. In particular, the methods and associated structure of the present invention permit access to a logical unit of a storage system immediately following creation of the logical unit. Initialization of the logical unit to initialize redundancy information therein proceeds in parallel with host system access to the storage space of the logical unit. The initialization process maintains a boundary parameter value indicative of the progress of the initialization process. Storage space above the boundary has had its redundancy information initialized while storage space below the boundary has not. Where an I/O request is entirely above the boundary, it is processed normally in accordance with the management of the logical unit. Where part of an I/O request is below the boundary, it is processed in a special manner that assures integrity of the redundancy data.

14 Claims, 6 Drawing Sheets

METHOD FOR LOGICAL UNIT CREATION WITH IMMEDIATE AVAILABILITY IN A RAID STORAGE ENVIRONMENT

BACKGROUND OF THE INVENTION

1. Field of the Invention

The invention relates to a method for improving access to a newly defined logical unit in a storage system and in particular relates to methods and structures for creating a RAID logical unit so as to make it available immediately for processing of host I/O requests.

2. Description of Related Art

Typical computing systems store data within devices such as hard disk drives, floppy drives, tape, compact disk, etc. These devices are otherwise known as storage devices. The storage capacity of these storage devices has rapidly increased as computing applications' demand for storage have increased. Simultaneous with the increase in capacity, computer applications and users have demanded increased performance. Computing applications have become highly dependent on high performance, high capacity storage devices. However, such increased dependency on storage devices underscores the need for increased reliability of such storage subsystems. Failure of such high capacity, high performance storage devices and subsystems can cripple vital computing applications.

Disk array storage systems provide both improved capacity and performance as compared to single disk devices. In a disk array storage system, a plurality of disk drives are used in a cooperative manner such that multiple disk drives are performing, in parallel, the tasks normally performed by a single disk drive. Striping techniques are often used to spread large amounts of information over a plurality of disk drives in a disk array storage system. So spreading the data over multiple disk drives improves perceived performance of the storage system in that a large I/O operation is processed by multiple disk drives in parallel rather than being queued awaiting processing by a single disk drive.

However, adding multiple disk drives to a storage system reduces to reliability of the overall storage system. In particular, spreading data over multiple disk drives in a disk array increases the potential for system failure. Failure of any of the multiple disk drives translates to failure of the storage system because the data stored thereon cannot be correctly retrieved.

RAID techniques are commonly used to improve reliability in disk array storage systems. RAID techniques generally configure multiple disk drives in a disk array in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra disk drives that may be activated to replace a failed, previously active disk drive). The 1987 publication by David A. Patterson, et al., from University of California at Berkeley entitled *A Case for Redundant Arrays of Inexpensive Disks(RAID)*, reviews the fundamental concepts of RAID technology.

RAID level zero, also commonly referred to as disk striping, distributes data As stored on a storage subsystem across a plurality of disk drives to permit parallel operation of a plurality of disk drives thereby improving the performance of I/O write requests to the storage subsystem. Though RAID level zero functionality improves I/O write operation performance, reliability of the disk array subsystem is decreased as compared to that of a single large disk drive. To improve reliability of disk arrays, other RAID geometries for data storage include generation and storage of redundancy information to permit continued operation of the disk array through certain common failure modes of the disk drives in the disk array.

There are six other "levels" of standard RAID geometries that include redundancy information as defined in the Patterson publication. Other RAID geometries have been more recently adopted and utilize similar concepts. For example, RAID level six provides additional redundancy to enable continued operation even in the case of failure of two disk drives in a disk array.

The simplest array, a RAID level 1 system, comprises one or more disks for storing data and an equal number of additional "mirror" disks for storing copies of the information written to the data disks. The remaining RAID levels, identified as RAID levels 2, 3, 4 and 5 systems by Patterson, segment the data into portions for storage across several data disks. One or more additional disks are utilized to store error check or parity information. RAID level 6 further enhances reliability by adding additional redundancy information to permit continued operation through multiple disk failures. The methods of the present invention may be useful in conjunction with any of the standard RAID levels.

RAID storage subsystems typically utilize a control module (controller) that shields the user or host system from the details of managing the redundant array. The controller makes the subsystem appear to the host computer as one (or more), highly reliable, high capacity disk drive. In fact, the RAID controller may distribute the host computer system supplied data across a plurality of the small independent drives with redundancy and error checking information so as to improve subsystem reliability. The mapping of a logical location of the host supplied data to a physical location on the array of disk drives is performed by the controller in a manner that is transparent to the host system. RAID level 0 striping for example is transparent to the host system. The data is simply distributed by the controller over a plurality of disks in the disk array to improve overall system performance.

RAID storage systems generally subdivide the disk array storage capacity into distinct partitions referred to as logical units (LUNs). Each logical unit may be managed in accordance with a selected RAID management technique. In other words, each LUN may use a different RAID management level as required for its particular application.

A typical sequence in configuring LUNs in a RAID system involves a user (typically a system administrator) defining storage space to create a particular LUN. With the storage space so defined, a preferred RAID storage management technique is associated with the newly created LUN. The storage space of the LUN is then typically initialized—a process that involves formatting the storage space associated with the LUN to clear any previously stored data and involves initializing any redundancy information required by the associated RAID management level.

The formatting and other initialization a LUN is generally a time-consuming process. Formatting all storage space for a large LUN may take several minutes or even hours. Often, the initialization processing further includes a verification step to verify proper access to all storage space within the LUN. Such verification may include writing and reading of test data or commands on each disk of the LUN to verify proper operation of the LUN. Errors detected in this verification process that relate to recording media defects are then repaired if possible (i.e., by allocating a spare sector or track of the associated disk drive to replace a defective one). This verification process is yet another time consuming aspect of the LUN initialization process.

Most presently known RAID storage systems preclude processing of host I/O requests for the logical unit until after the initialization has completed. In such systems, the logical unit is said to be unavailable until initialization has completed. Some RAID storage systems have improved upon these known systems by making the logical unit available as soon configuration information has been saved to define the mapping of data within the logical unit and as soon redundancy information has been initialized for the entire LUN. Time consuming disk media verification is skipped in lieu of sensing and correcting such errors as the LUN is used.

It remains a problem however unit in such improved systems, to make the logical unit available as soon as possible for processing of host I/O requests. Initialization of redundancy information still requires significant amount of time wherein large logical unit is defined. Further, presently known logical unit initialization sequences cease operation of the LUN when one of the drives in the logical unit fails. Further access to the logical unit having failed drives is then precluded in presently known RAID systems.

It is therefore the problem to make a newly defined RAID logical unit available for host I/O processing as soon as possible, preferably even during initialization. It is a further problem to assure that the logical unit is available for processing of host I/O requests unit when a drive in the LUN is sensed to have failed during the initialization sequence.

SUMMARY OF THE INVENTION

The present invention solves the above and other problems, thereby advancing the state of the useful arts, by providing methods and associated structure to permit immediate availability of newly defined LUNs as soon as possible after configuration information regarding the LUN has been saved. The present invention allows I/O requests to be performed on a logical unit in parallel with initialization of the redundancy information in the LUN. Furthermore, the present invention assures continued availability of the logical unit and eventual completion of LUN initialization despite failure of a disk drive during the initialization process. Methods of the present invention permit such a LUN with a failed drive to continue operation though in a degraded mode.

More specifically, methods and structures of the present invention permit immediate availability of a newly created logical unit for processing host I/O requests while redundancy information for the LUN is being initialized. Methods of the present invention maintain boundary information regarding progress in initializing redundancy information for the LUN. Host I/O requests for writing of data below this boundary level (i.e., in an area of the LUN for which redundancy information has not yet been initialized) are performed in a manner that assures valid redundancy data is generated and written. Conversely, host I/O requests for writing of data above the boundary level (i.e., in an area of the LUN for which valid redundancy information has already been initialized) proceed in a normal manner in accordance with the associated RAID level for the LUN.

In a further aspect of the present invention, initialization of redundancy information in accordance with the present invention as described above is terminated in response to detection of a failed disk drive in the LUN. However, unlike prior techniques, the LUN remains available for processing of HOST I/O requests though in a degraded mode. When the failed disk drive is eventually replaced, standard RAID regeneration techniques to recover loss data are used to complete the initialization of redundancy information for the LUN.

Another aspect of the invention lies in the capability to resume the initialization process. The present status of the initialization is maintained as each portion of the LUN is initialized. As the boundary separating initialized from un-initialized areas of the LUN is moved, checkpoint data is saved to enable recovery at any point in the initialization. If the initialization is interrupted, such as due to a power loss, the checkpoint information is used to resume the initialization where it left off.

It is therefore an object of the present invention to provide methods and associated structure that permit immediate availability of a newly created RAID logical unit.

It is another object of the present invention to provide methods and associated structure that permit immediate availability of a newly created RAID logical unit prior to initialization of all redundancy information in the logical unit.

It is a further object of the present invention to provide methods and associated structure that permit completion of initialization of a newly created LUN despite failure of a disk drive in the LUN.

It is still a further object of the present invention to provide methods and associated structures to permit interruption of the initialization of a newly created LUN such that the initialization is completed when a failed disk drive is replaced.

It is still another object of the present invention to provide methods and associated structure that permits host I/O requests to be processed in parallel with initialization of redundancy information in a newly defined logical unit.

It is yet another aspect of the present invention to provide methods and associated structure that permit completion of redundancy information initialization in a newly defined logical unit by use of standard RAID regeneration techniques in accordance with the RAID management level of the logical unit.

It is still another aspect of the present invention to provide methods and associated structure to permit interruption of the initialization procedure for a newly defined LUN such that the initialization may be resumed at a later time.

The above and other objects, aspects, features, and advantages of the present invention will become apparent from the following detailed description and the attached drawings.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Storage System of the Present Invention

Figure 1:
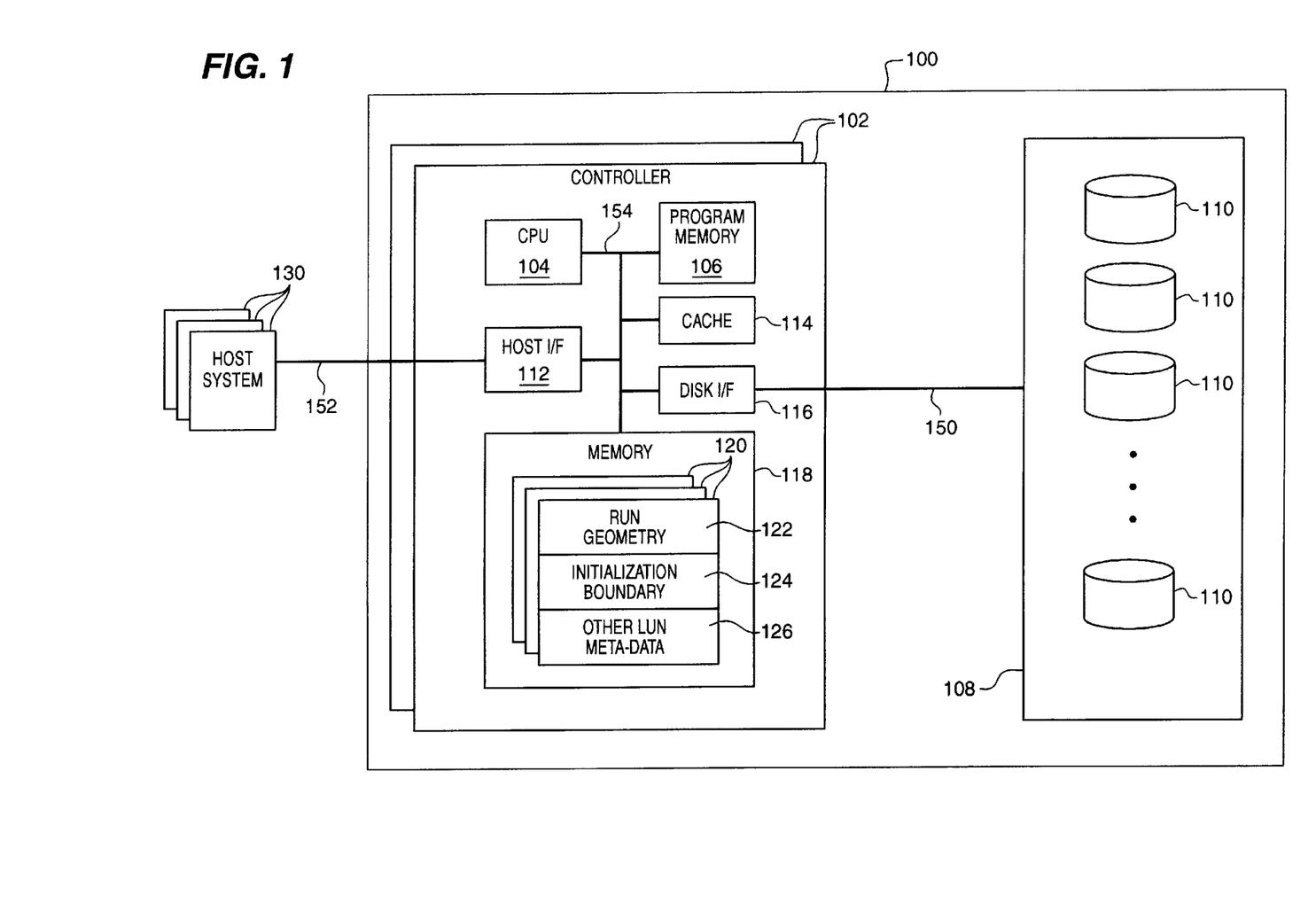
FIG. 1 is a block diagram of a storage system embodying the methods and structures in accordance with the present invention.

FIG. 1 is a block diagram depicting a typical RAID storage system 100 embodying the methods and associated structures of the present invention. One or more controllers 102 receive and process I/O requests from one or more host systems 130 via path 152. Processing of the I/O requests generally involves performing lower-level I/O operations on disk array 108 via path 150. Disk array 108 comprises a plurality of disk drives 110 that are in turn logically subdivided by storage management methods of the controllers 102 into plurality of logical units (LUNs). Each LUN is managed by controller 102 in accordance with an associated RAID storage management level (i.e., RAID levels 0 through 6). Those skilled in the art will readily recognized that paths 152 and 150 may be implemented using any of several well-known industry standard communication media and protocols including, for example, SCSI, Fibre Channel, SSA, IPI, etc.

Each controller 102 generally comprises a CPU 104 that manages the overall operation of the controller 102 to process received I/O requests from host systems 130. CPU 104 fetches program instructions from program memory 106 via processor bus 154. Methods of the present invention are therefore preferably embodied as programmed instructions within program memory 106 operable within CPU 104 of controller 102.

Host interface 112 provides the interface between CPU 104 and host systems 130 via path 152 and processor bus 154. In like manner, disk interface 116 provides the interface between CPU 104 and disk array 108 via path 150 and processor bus 154. As noted above, interfaces 112 and 116 are well-known commercially available devices designed to adapt signals between processor bus and either path 150 or 152 in accordance with the selected media and protocol of their respective interfaces.

Cache memory 114 enhances performance of controller 102 in processing I/O requests received from host systems 130. In general, I/O write requests are processed by temporarily storing modified information in cache memory 114 and later flushing or posting such cached information through disk interface 116 to disk array 108 for persistent storage on disks 110. In like manner, I/O read requests are more rapidly processed by retrieving requested information from cache memory 114. Cache memory management methods and architectures are well-known to those skilled in the art.

Memory 118 is a random access memory subsystem utilized for purposes of storing and retrieving management information regarding each LUN in disk array 108. Each LUN in disk array 108 has a corresponding LUN meta-data structure 120 that describes required management information to manipulate a corresponding LUN. Each LUN meta-data structure 120 includes the LUN's geometry information 122, initialization boundary parameter value 124, and other LUN meta-data 126.

LUN geometry information 122 includes information required for RAID storage management of the LUN. Most RAID storage systems provide access to a LUN in storage units referred to as blocks. The user views the LUN as a sequence of logical blocks identified by sequential block numbers through the number of blocks allocated in the LUN. Depending on the RAID management level associated with the LUN, these logical block numbers are mapped or translated into corresponding physical block numbers—physical locations on the disk drives. LUN geometry information 122 therefore includes mapping information describing a logical to physical mapping of blocks within the LUNs as well as information regarding the desired RAID management level to be used in manipulating the corresponding LUNs. Such mapping of blocks in accordance with RAID management levels is well known to those skilled in the art.

Initialization boundary parameter value 124 is used, as described further herein below, to indicate the degree of progress in the initialization of a newly created LUN. Other status and configuration information regarding the particular LUNs is stored in other LUN meta-data 126.

Those skilled in the art will readily recognized that FIG. 1 is intended to be representative of a wide variety of possible storage system architectures that may embody the methods and structures of the present invention. FIG. 1 therefore represents all such storage systems and controller architectures in which the methods and associated structures of the present invention may be advantageously applied.

LUN Creation Method

Figure 2:
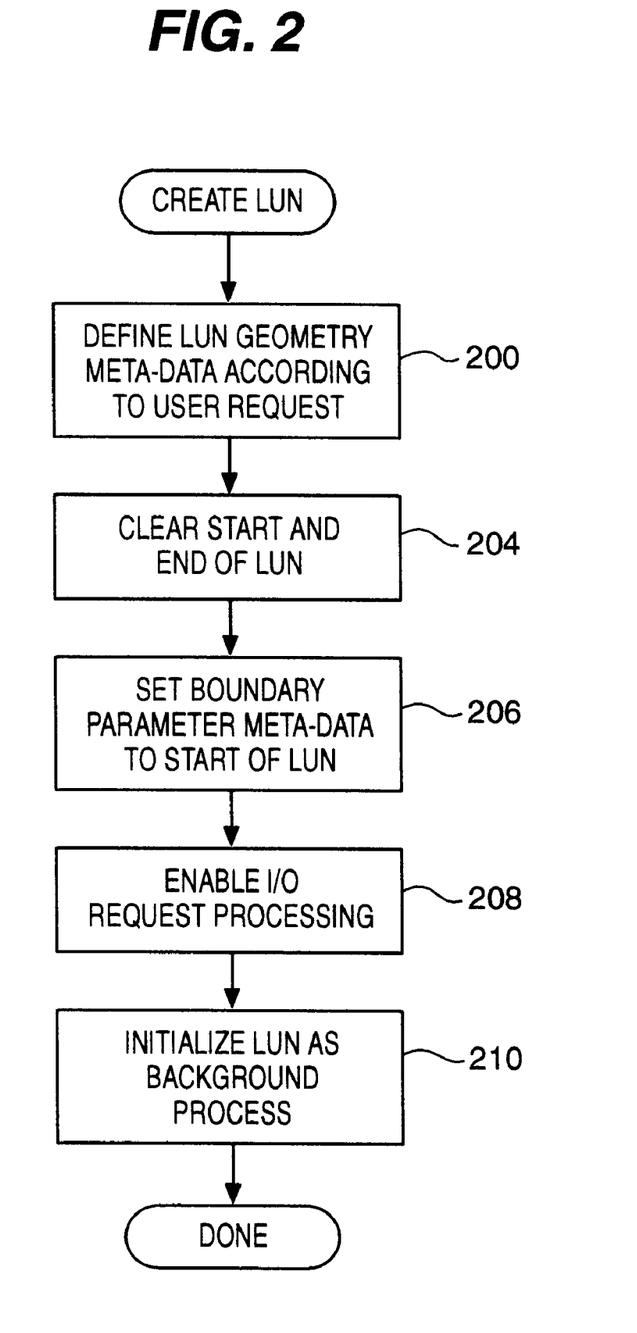
FIG. 2 is a flowchart describing a method of the present invention for creating a new logical unit in a storage system.

FIG. 2 is a flowchart describing a method of the present invention for creating a newly defined LUN within the storage subsystem. Element 200 in his first operable to define LUN geometry meta-data information according to the user's request for creating a new logical unit. As noted above, the geometry meta-data describes, among other things, the logical to physical mapping of data in the LUN in accordance with the user's selected RAID management level and other user defined parameters.

Element 204 is next operable to clear a small portion of the storage space of the LUN. The storage areas near the start and end of a LUN are often utilized for file system information by an operating system. Clearing small portions at the beginning and end of the LUN may help such file system software to identify the LUN as un-initialized. This heuristic approach as helpful to a number of common storage applications such as file system applications in common, commercially available operating systems. Those skilled in the art recognized that the methods of the present invention largely rely on system and application software that is not dependent on the storage space all being initialized. Element 204 is therefore a heuristic attempt to prevent many common application and system programs from viewing the LUN as initialized with "random" data. The processing of element 204 is not however a necessary step for application of the methods of the present invention. A large class of storage applications do not rely on the storage space of a LUN to be cleared or initialized prior to use.

Element 206 is next operable to set the boundary parameter value in the meta-data structure of the LUN to indicate that none of the LUN is yet initialized. As used herein, "initialized" refers to consistency of stored data and related redundancy information. As noted above, prior techniques insisted on either initializing in the entire LUN to zero or at a minimum initializing the redundancy information portion of the LUN to values consistent with the otherwise un-initialized data portions. The boundary parameter value is used to distinguish portions of a LUN that have been initialized from those portions yet to be initialized. Element 208 is then operable to enable processing I/O requests in parallel with the initialization of the LUN about to commence. Processing of I/O requests in accordance with the present invention are discussed in further detail herein below.

Lastly, element 210 is operable to initialize the LUN as a background process operating in parallel with I/O request processing. As discussed further herein below, I/O request processing proceeds in accordance with the present invention in cooperation with simultaneous, background initialization of the LUN redundancy information. The boundary parameter noted above is used to aid the I/O request processing methods of the present invention in determining how to properly process a particular I/O request. Additional details of this cooperative processing are discussed herein below. This completes the method of the present invention for creation or definition of a new LUN.

LUN Initialization Method

Figure 3:
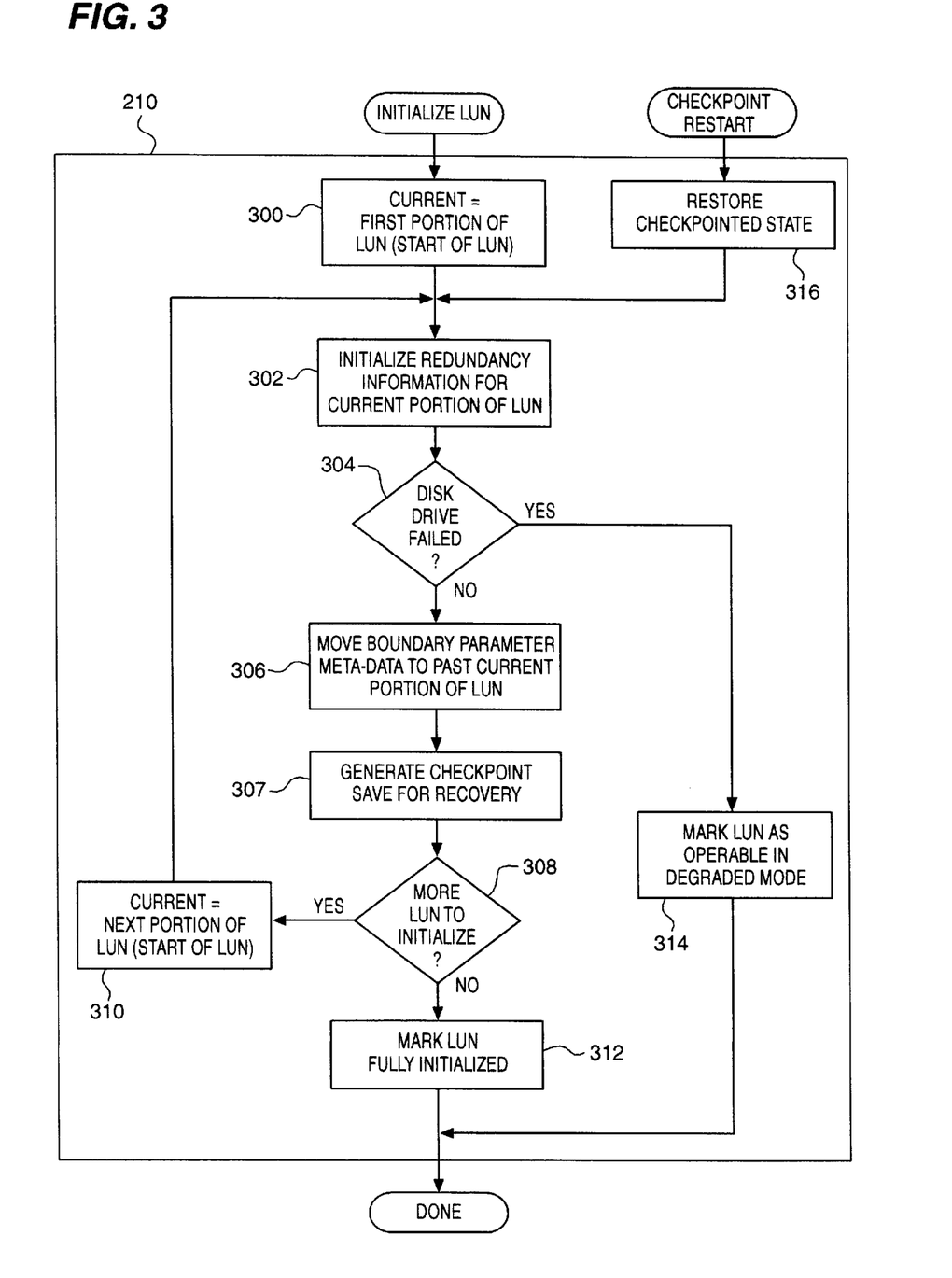
FIG. 3 is a flowchart describing a method of the present invention to initialize a newly created logical unit in parallel with processing of I/O requests directed to the logical unit.

FIG. 3 is a flowchart describing processing of element 210 in additional detail. Specifically, element 210 performs initialization of the redundancy information in a LUN to assure integrity and consistency of the redundancy information with the otherwise un-initialized data of the LUN. Those skilled in the art will recognize that such redundancy information initialization is dependent on the type of RAID management associated with the LUN. Specifically, RAID level 1 (mirroring) redundancy information initialization entails copying the un-initialized data to the corresponding mirrored position in the LUN, or in the alternative, initializing both the data and redundancy portion to zeros. By contrast, initialization of redundancy information in a RAID level 5 LUN entails reading the otherwise un-initialized data in each stripe of the LUN, computing the Exclusive OR parity of the un-initialized data, and storing such generated parity information in appropriate blocks of the stripe.

In particular, element 300 is first operable to set a local variable CURRENT to point to the first physical portion of storage space in the LUN (i.e., to the start of the LUN). Elements 302 through 310 are then iteratively operable to initialize each subsequent portion of the LUN. Those skilled in the art will recognized that each "portion" may constitute one or more stripes where appropriate to the RAID management or may constitute an arbitrary defined buffer size as appropriate for the particular RAID management level associated with the LUN.

Element 302 is specifically operable to initialize redundancy information for the portion of the LUNs presently pointed to by the local variable CURRENT (e.g., the current portion of the LUN). Element 304 is then operable to determine whether the initialization process performed by element 302 detected any failure in a disk drive of the LUN. As noted above, element 302 may read and/or write various blocks of the LUN for purposes of initializing associated redundancy information. If any of the read or write operations result in detection of failure of a disk drive, as detected by element 304, processing continues with element 314 to mark the LUN as operable though only in degraded mode. This then completes processing of element 210.

If no such drive failure is detected, element 306 is next operable to adjust the boundary parameter value in the LUN meta-data structure to point past the CURRENT portion of the LUN (i.e., to point to the next portion of LUN yet to be initialized). Element 307 then saves state information regarding the progress of the LUN initialization. This saved data (also referred to herein as checkpoint data) is used later if the initialization process is resumed after being interrupted (i.e., by a power loss in the storage system).

Element 308 is then operable to determine whether more portions of the LUN remain to be initialized. If so, element 310 is next operable to set the local variable CURRENT to the next portion of the LUN to be initialized. Processing then continues by looping back to element 302 until all portions of LUN had been so initialized or until a disk drive failure is detected by processing of element 304. In the preferred embodiment, a delay may be inserted in the processing of the initialization to permit resources of the storage system to be utilized for processing host requests rather than being totally consumed by the initialization sequence. In the alternative, a periodic check can be made to determine if such host I/O requests are pending or queued. When such requests are found to be queued the initialization process may then pause briefly to permit processing of those requests. Such design choices of multitasking and processor time sharing are well known to those skilled in the art.

Element 312 is finally operable when all portions of the LUN have been initialized to mark the LUN has fully initialized allowing all I/O requests to be processed in accordance with normal I/O processing for LUN. Processing of I/O requests in cooperation with the initialization process of FIG. 3 is discussed in additional detail herein below.

The processing of FIG. 3 may also be entered in response to a resumption of the initialization process following interruption of a previous initialization. As noted above, the method of FIG. 3 saves checkpoint data as it progresses in the initialization process. This checkpoint data is used in element 316 to restore the previous state of the initialization process. In this manner, a previously interrupted initialization process may be resumed following such an interruption.

I/O Request Processing Method

Figure 4:
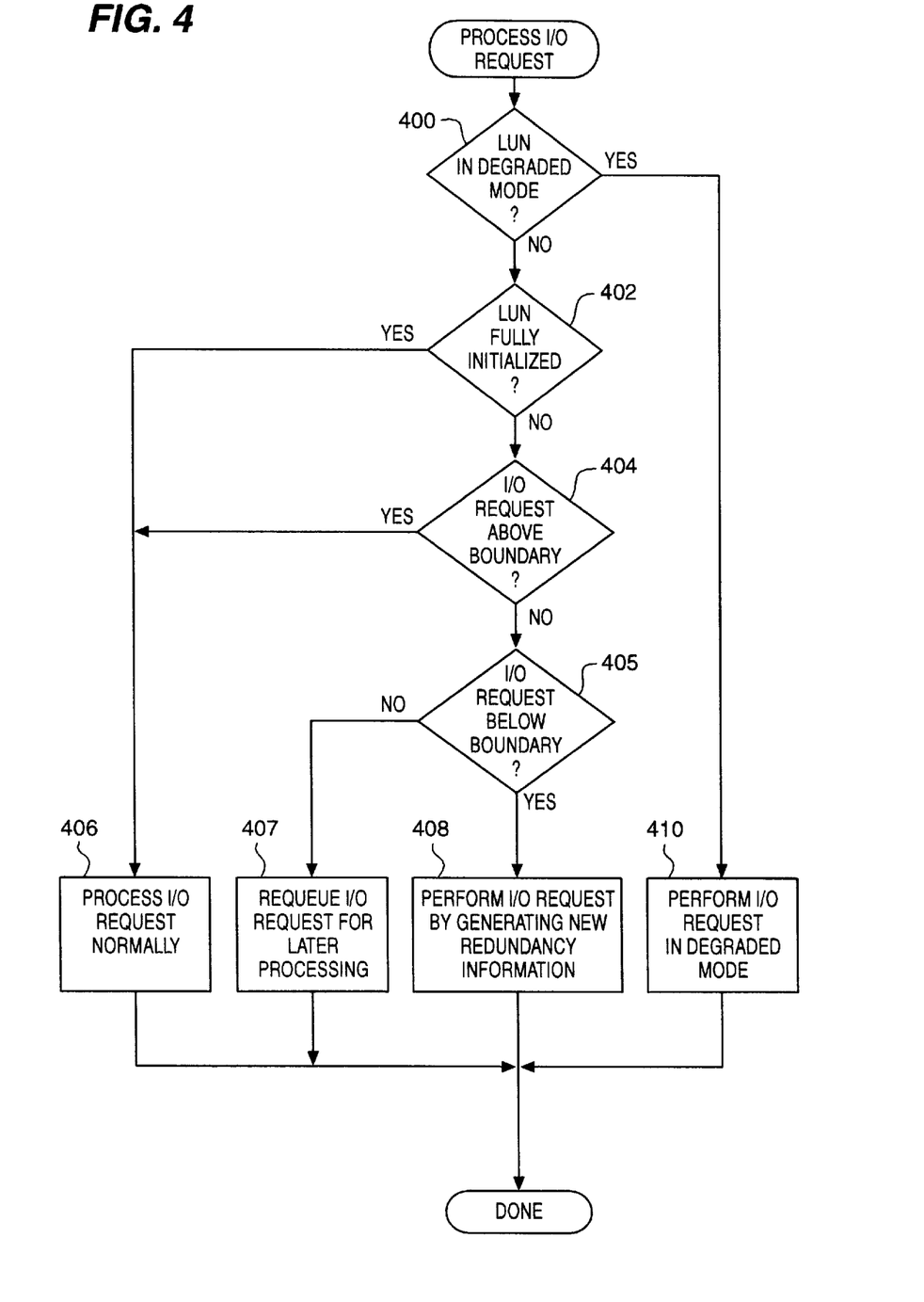
FIG. 4 is a flowchart describing a method of the present invention to process I/O requests directed to a logical unit in parallel with initializing the newly created logical unit.

FIG. 4 is a flowchart describing the operation a method of the present invention for processing I/O requests in parallel with initialization as discussed above. In accordance with the present invention, I/O requests are handled in one of three manners depending on the state of the LUN and be progress of initialization of the LUN. Specifically, element 400 is first operable to determine whether LUN is operating in degraded mode in response to sensing of failure of one or more disk drives. If the LUN is presently operating in such a degraded mode, element 410 is operable to perform the requested I/O operations in the degraded mode of the LUN. Such degraded mode operation of a disk array LUN is well known to those skilled in the art. In general, such degraded mode operation entails carefully updating data and/or associated redundancy information in such a manner as to ensure that no data will be lost so long as no further disk failures occur.

If the LUN is not operating in degraded mode but rather is operable in normal mode, element 402 is next operable to determine whether the LUN has been fully initialized as described above. If the initialization to the LUN has completed as described above with respect to FIG. 3, element 406 is next operable to process the I/O request in a normal fashion in accordance with the RAID management level associated with the LUN.

If the LUN is not yet fully initialized, element 404 is operable to determine whether the particular I/O request requires access exclusively to data and redundancy information above the presently set boundary parameter value.

As noted above, the boundary parameter value in the LUN the meta-data structure is indicative of the progress of the initialization of the LUN as described above with respect to FIG. 3. If this I/O request access data or redundancy information completely above the present boundary parameter value, element 406 is operable as described above to process the I/O request in a normal fashion in accordance with the RAID management level associated with the LUN.

If the data to be accessed is not fully above the boundary, element 405 is next operable to determine if the data to be accessed is fully below the boundary. If so, the entire request is in the un-initialized area of the LUN and element 408 is operable to perform the I/O request in a manner cognizant of the un-initialized information in the LUN. Specifically, the I/O request is processed by generating new redundancy information consistency with the data to be written by the I/O request (and with any related old, un-initialized data remaining in affected areas of the LUN).

If the data to be accessed is neither fully above nor fully below the present boundary but rather spans the boundary, element 407 is operable to requeue the I/O request for later processing. The I/O request is requeued since it is likely that the initialization processing will proceed to the point past the data to be accessed in the near future. This brief delay is found to be relatively unimportant in the overall processing by the storage system. Such instances occur rarely. In the alternative, those skilled in the art will recognize that an I/O request that spans the present boundary may also be processed as in element 408 above. Such processing would conservatively process the I/O request as though it were below the boundary in its entirety. Such equivalent design choices are well known to those skilled in the art.

It all four cases, that is processing I/O requests by element 406, element 407, element 408, or element 410, processing of the I/O request is completed.

Those skilled in the art will recognize that the processing of element 408 to generate new redundancy information is performed in accordance with the particular RAID management level associated with the LUN. For example, where the LUN is managed in accordance with RAID level 1 mirroring, generation of new redundancy information entails writing of the user requested data and duplicating the data in the associated mirror portion of the LUN. By contrast, where the LUN is managed in accordance with RAID level 5 techniques, processing of element 408 entails generation of new redundancy information by Exclusive OR parity operations including the data modified by the I/O write request and any associated old data remaining on the LUN in the related stripe. It all such cases, operation of element 408 leaves the redundancy information associated with the I/O write request in a consistent state such that it maybe relied upon in processing of subsequent read or write requests.

Method for Handling Disk Failure During Initialization

Figure 5:
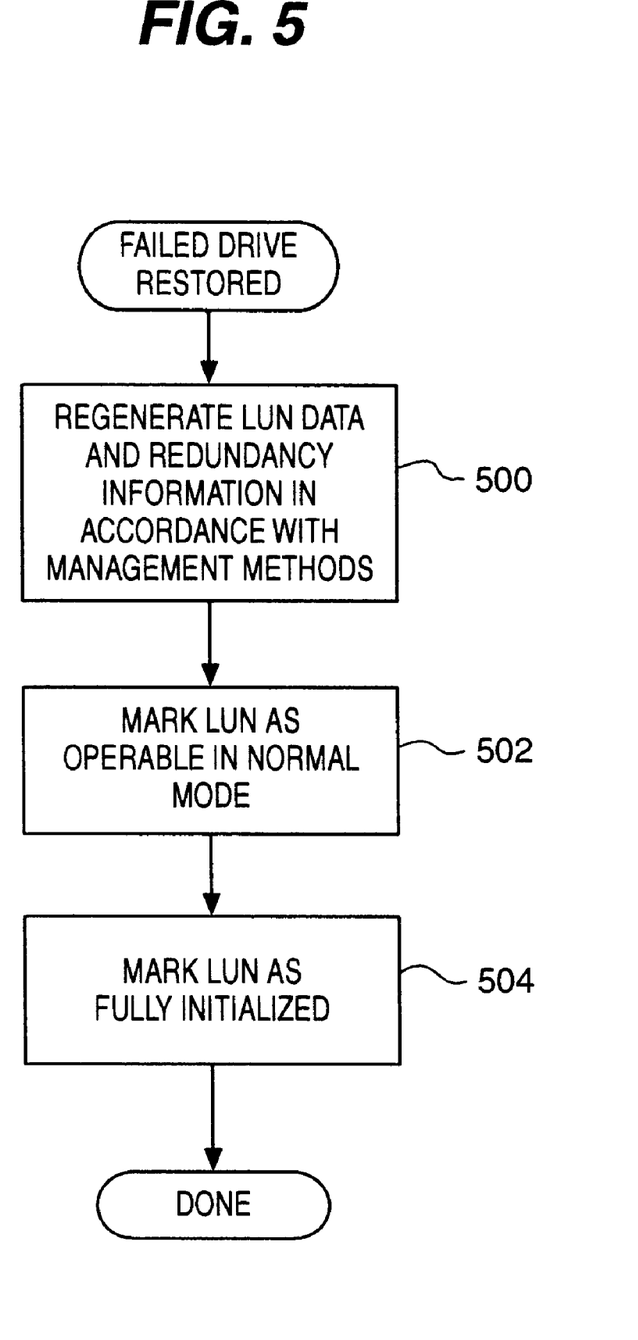
FIG. 5 is a flowchart describing a method of the present invention operable to complete initialization of a newly created logical unit the initialization of which was prematurely terminated by sensing a drive failure.

FIG. 5 is a flowchart describing a method of the present invention operable in response to sensing the restoration of operation of a previously failed disk drive. As noted above, initialization of the LUN in accordance with the present invention is terminated when the initialization sequence senses failure of one or more disk drives in the LUN. The LUN is marked so that I/O request processing may continue though in a degraded mode of operation. When the failed disk drive has been restored to normal operation (i.e., repaired and/or replaced), standard RAID management regeneration techniques are used to assure integrity and reliability of the data stored on LUN. Such regeneration also serves to complete the previously terminated initialization of the LUN by assuring that all data and associated redundancy information in the LUN are consistent.

In particular, element 500 is operable in accordance with the RAID management technique presently assigned to the LUN to regenerate all LUN data and redundancy information affected by replacement of the failed disk drive. Element 502 is then operable to mark the LUN as restored to normal operation as distinct from degraded mode operation. Lastly, element 504 is operable to mark the LUN as fully initialized because the regeneration techniques of the RAID management have accomplished the purpose of initialization: namely, to make all redundancy information consistent with the data stored in the LUN.

Figure 6:
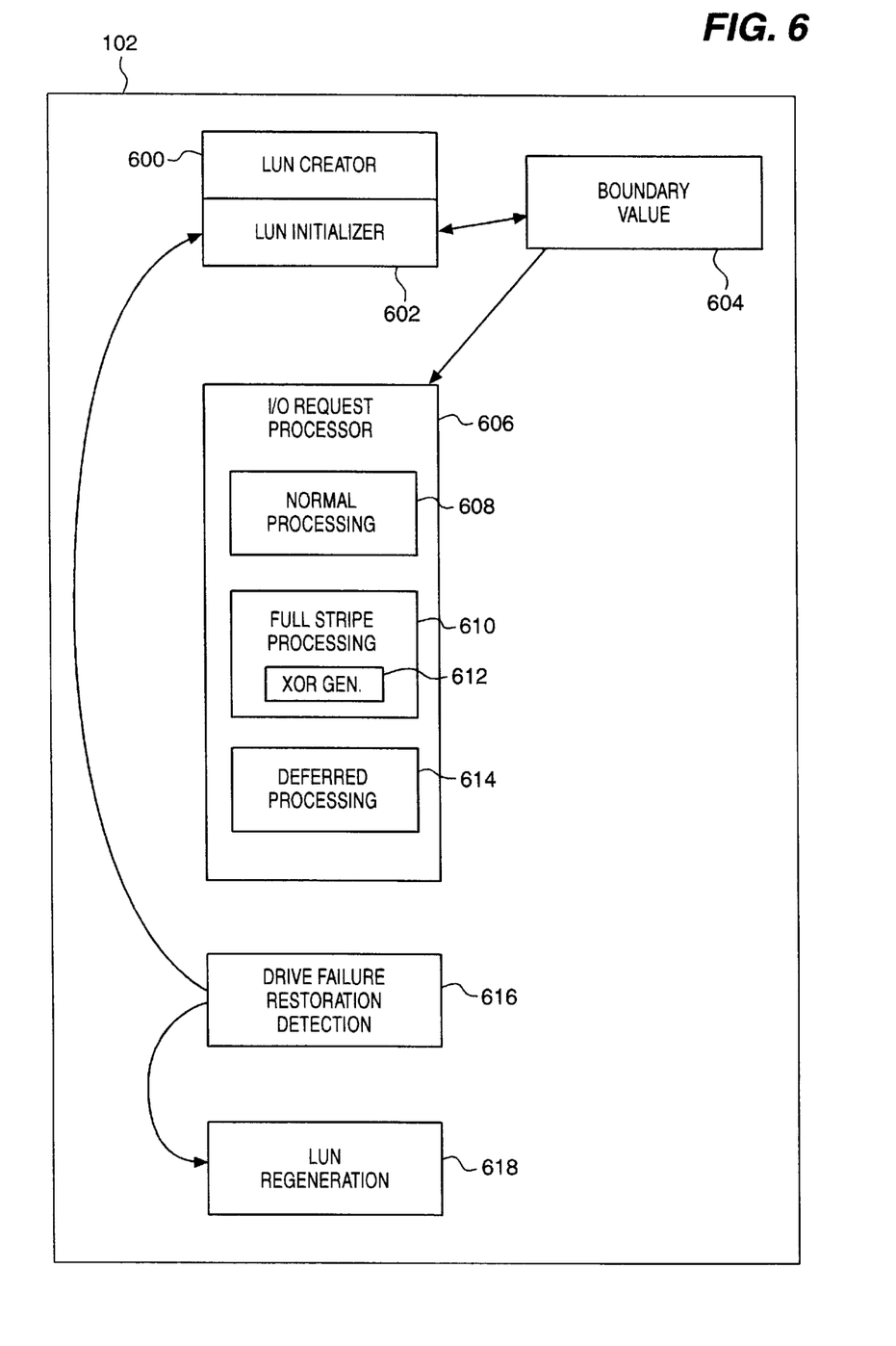
FIG. 6 is a block diagram of the significant functional elements operable within the storage controller in accordance with the present invention.

FIG. 6 is a block diagram depicting the significant functional elements operable within a controller 102 in accordance with the present invention. Those skilled in the art will recognize the functional decomposition of FIG. 6 as merely one exemplary decomposition of the functional elements. Many equivalent functional decompositions of the processing of the present invention will occur to those skilled in the art.

A LUN creator element 600 is tightly coupled to a LUN initialization element 602. LUN creator 600 creates a newly defined LUN in accordance with input from a user of the system. The user defines a number of parameters for the LUN architecture including the RAID management level to be used with the LUN and physical, geometric mapping of data on the LUN.

I/O request processor 606 processes I/O requests received from attached host systems. As noted above, the methods and structure of the present invention permit LUN initializer 602 and I/O request processor 606 to carry on processing in parallel. LUN initializer 602 maintains status information in boundary value 604 indicative of progress in the initialization process. I/O request processor 606 inspects the boundary value 604 to determine whether the I/O request may be processed normally or must be processed in a special manner due to the parallel initialization processing.

I/O request processor 606 is therefore comprised of a variety of processing elements for processing of I/O requests. Normal processing 608 processes I/O request in the normal course of storage management associated with the LUN. Normal processing 608 is invoked when the I/O request accesses only data that resides fully within the area of the LUN for which initialization has completed. Where the data to be accessed by an I/O request resides fully outside the initialized portion of the LUN, full stripe processing 610 is invoked. Full stripe processing 610 assures integrity of the data to be written to the un-initialized area of the LUN by performing only full stripe writes. The full stripes include newly generated redundancy information generated by redundancy generator element 612 (i.e., XOR parity generation). Writing of a full stripe assures integrity of the data and associated redundancy information in the stripe despite the fact that the LUN initializer 602 has not yet processed through that area of the LUN. Lastly, as noted above, I/O request processor 606 may include a deferred processing element 614 to simply requeue an I/O request for later processing when the LUN initializer 602 has proceeded through the area affected by the I/O request. For example, an I/O request that spans an area of the LUN including the present boundary value 604 (i.e., crosses the present boundary of initialization processing), may be delayed for later processing by requeuing it. Later, when the request is again processed by I/O request processor 606, the initialization of the LUN may have passed by the affected area permitting the I/o request to be processed as a normal request.

Drive failure/restoration detector element 616 monitors the status of the disk drives to determine whether a drive in the LUN is has failed during the initialization processing. If so, LUN initializer 602 is terminated. When the failed disk drive is restored to normal operation, LUN regeneration element 618 is notified to commence processing to regenerate the data and redundancy information of the LUN in accordance with the RAID storage management level assigned to the LUN. This regeneration by standard RAID techniques serves the dual purpose of completing the initialization sequence that was terminated upon sensing of the drive failure.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method operable in a RAID storage system for enabling immediate access to said RAID storage system comprising the steps of:
   creating a RAID level 5 logical unit within said RAID storage system;
   initializing said logical unit in response to creation of said logical unit;
   processing I/O requests directed to said logical unit in parallel with the step of initializing, wherein the step of initializing comprises steps of
      maintaining a boundary parameter value indicative of the progress of the initialization of said logical unit wherein said boundary parameter value indicates a physical position in said logical unit above which initialization is complete and below which initialization is incomplete,
      saving checkpoint data periodically during processing of the step of initializing indicative of progress of the step of initializing,
      interrupting processing of the step of initializing, and resuming the step of initializing using said checkpoint data, and the step of processing comprises steps of
         determining whether an I/O request to be processed includes access to storage space of said logical unit below said boundary parameter value,
         processing said I/O request normally in response to determining that said I/O request does not include access to storage space below said boundary parameter value,
         processing said I/O request in a manner so as to assure integrity of redundancy information associated with data of said I/O request in response to determining that said I/O request requires access to storage space below said boundary parameter value,
         requeuing said I/O request for later processing in response to a determination that the data to be accessed crosses said boundary parameter value.

2. The method of claim 1 further comprising the steps of:
   sensing failure of a failed disk drive of said logical unit during the step of initialization; and
   terminating the step of initialization in response to sensing of said failure.

3. The method of claim 2 further comprising the steps of:
   sensing restoration of operation of said failed disk drive; and
   regenerating information stored in said logical unit to complete initialization of said logical unit in response to sensing of said restoration of operation.

4. The method of claim 2 wherein the step of processing I/O requests includes the step of:
   operating said logical unit in a degraded mode to continue processing of said I/O requests.

5. The method of claim 1 wherein the step of processing said I/O request to assure integrity includes the step of:
   generating new redundancy information from data associated with said I/O request regardless of un-initialized redundancy information presently stored on said logical unit below said boundary parameter value.

6. A RAID storage system comprising:
   a logical unit creator to define a RAID level 5 logical unit in said storage system;
   a logical unit initializer to initialize said logical unit by assuring consistency of redundancy information and data in said logical unit, save checkpoint data periodically during initialization indicative of progress of the initialization, interrupt the initialization, and resume the initialization using said checkpoint data; and
   an I/O request processor to process I/O requests directed to said logical unit from attached host systems, wherein said logical unit initializer is operable in parallel with said I/O request processor, said I/O request processor further configured for determining whether an I/O request to be processed includes access to storage space of said logical unit below said boundary parameter value, processing said I/O request normally in response to determining that said I/O request does not include access to storage space below said boundary parameter value, processing said I/O request in a manner so as to assure integrity of redundancy information associated with data of said I/O request in response to determining that said I/O request requires access to storage space below said boundary parameter value, requeuing said I/O request for later processing in response to a determination that the data to be accessed crosses said boundary parameter value.

7. (AMENDED) The system of claim 6 wherein said I/O request processor further comprises:
   a second I/O request processor to process I/O requests by generating new redundancy information in response to determining that information required for processing said I/O request has not been initialized as indicated by said boundary parameter indicator wherein said second I/O processor includes:
      a redundancy information generator for generating new redundancy information from data supplied in said I/O request regardless of un-initialized redundancy information presently stored is said logical unit.

8. The system of claim 6 wherein said logical unit initializer includes:
   a disk drive failure detector to detect failure of a failed disk drive in said logical unit during operation of said logical unit initializer wherein said disk drive failure detector terminates operation of said logical unit initializer in response to detection of failure of said failed disk drive in said logical unit.

9. The system of claim 8 further comprising:
   a disk drive replacement detector for detecting repair or replacement of said failed disk drive; and
   a logical unit regenerator, coupled to said disk drive replacement detector, for regenerating data and redundancy information affected by failure of said failed disk drive.

10. A storage controller in a RAID storage system for enabling immediate access to said RAID storage system, said storage controller comprising:

means for creating a RAID level 5 logical unit within said RAID storage system;

means for initializing said logical unit in response to creation of said logical unit; and means for processing I/O requests directed to said logical unit in parallel with operation of said means for initializing, wherein the means of initializing comprises means for maintaining a boundary parameter value indicative of the progress of the initialization of said logical unit wherein said boundary parameter value indicates a physical position in said logical unit above which initialization is complete and below which initialization is incomplete, means for saving checkpoint data periodically during processing of the initialization indicative of progress of the initialization, means for interrupting processing of the means for initializing, and means for resuming the initialization using said checkpoint data, and the means for processing comprises means for determining whether an I/O request to be processed includes access to storage space of said logical unit below said boundary parameter value, means for processing said I/O request normally in response to determining that said I/O request does not include access to storage space below said boundary parameter value, means for processing said I/O request in a manner so as to assure integrity of redundancy information associated with data of said I/O request in response to determining that said I/O request requires access to storage space below said boundary parameter value, means for requeuing said I/O request for later processing in response to a determination that the data to be accessed crosses said boundary parameter value.

11. The controller of claim 10 further comprising:

means for sensing failure of a failed disk drive of said logical during operation of said means for initializing; and means for terminating the said means for initializing in response to sensing of said failure.

12. The controller of claim 11 further comprising:

means for sensing restoration of operation of said failed disk drive; and means for regenerating information stored in said logical unit to complete initialization of said logical unit in response to sensing of said restoration of operation.

13. The controller of claim 11 wherein the means for processing I/O requests includes:

means for operating said logical unit in a degraded mode to continue processing of said I/O requests.

14. The controller of claim 10 wherein the means for processing said I/O request to assure integrity includes:

means for generating new redundancy information from data associated with said I/O request regardless of un-initialized redundancy information presently stored on said logical unit below said boundary parameter value.

* * * * *